Jan. 16, 1923.
R. KASIK.
HOUSEHOLD NOODLE CUTTER.
FILED OCT. 26, 1921.
1,442,616.
2 SHEETS—SHEET 1.
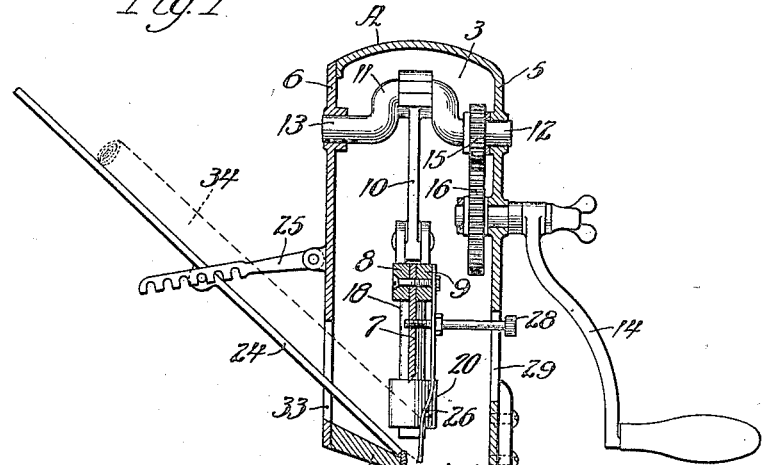
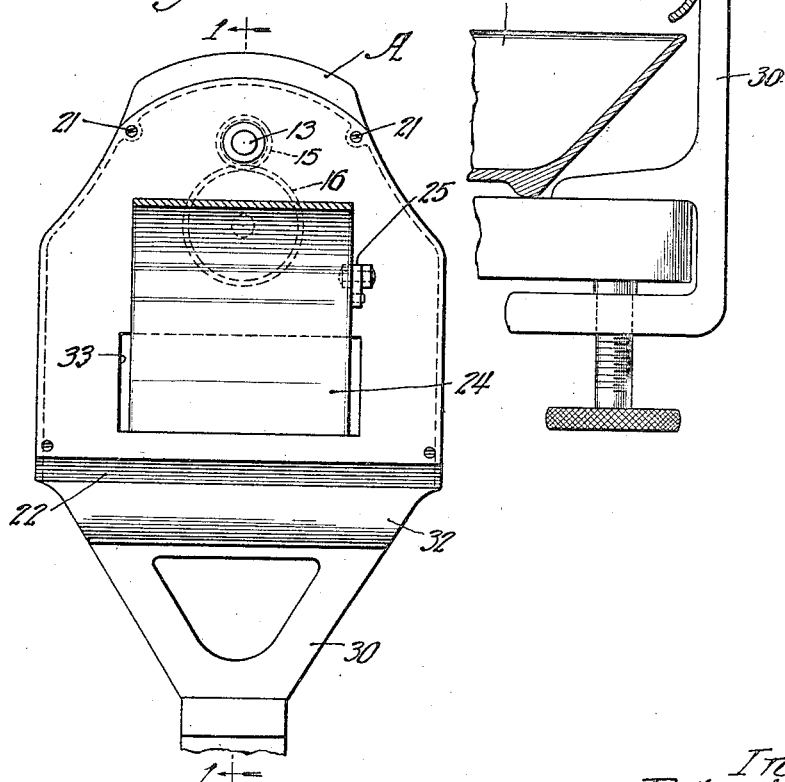
Inventor.
Robert Kasik.

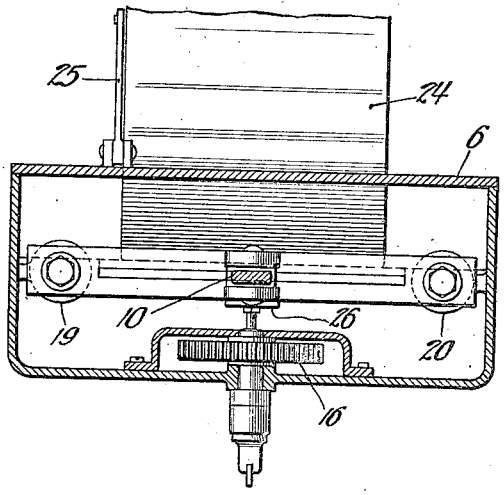
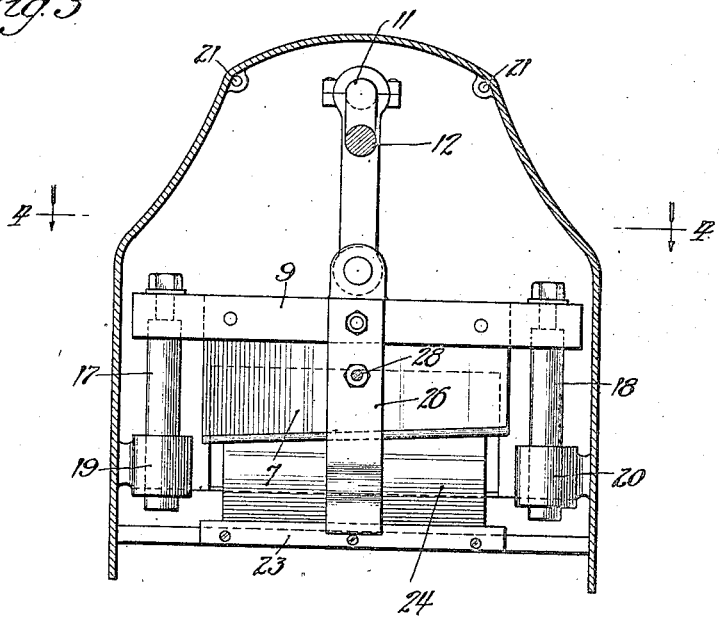

Patented Jan. 16, 1923.

1,442,616

UNITED STATES PATENT OFFICE.

ROBERT KASIK, OF CHICAGO, ILLINOIS.

HOUSEHOLD NOODLE CUTTER.

Application filed October 26, 1921. Serial No. 510,481.

*To all whom it may concern:*

Be it known that I, ROBERT KASIK, a citizen of the United States, residing at Chicago, in the county of Cook and State of Illinois, have invented a certain new and useful Improvement in Household Noodle Cutters, of which the following is a full, clear, concise, and exact description, reference being had to the accompanying drawings, forming a part of this specification.

My invention relates to household noodle cutters and has to do more particularly with the provision of such a device compact of construction, simple in operation and cheap to manufacture. The various features of construction will be more particularly referred to throughout the ensuing specification and appended claims.

For a better understanding of my invention, reference is to be had to the accompanying drawings in which—

Fig. 1 is a vertical cross section through the middle of the device as along the line 1—1 of Fig. 2;

Fig. 2 is a back view of Fig. 1, that is assuming the handle to be at the front;

Fig. 3 is a sectional view along the line 3—3 of Fig. 1; and

Fig. 4 is a transverse sectional view along the line 4—4 of Fig. 3.

Now as to the detailed construction of the preferred form of my invention as shown herein, it comprises a casing A having front and rear sections 5—6 respectively, the front section 5 acting as a frame for supporting the operating mechanism. The rear wall or section 6 is detachably secured to the other section by means of screws 21 so that this wall 6 may be readily applied and removed.

This operating mechanism includes a reciprocatable knife 7 clamped between the halves 8—9 of a cross bar connected by means of a connecting rod 10 with a crank shaft 11. This crank is rotatably mounted in the bearings 12—13 in the front and rear sections of the casing A and is geared to the manually operated handle 14 through the gears 15—16 of a suitable ratio, two to one being shown.

Now as to the mounting for the knife 7, this includes a pair of studs 17—18 rigidly secured to the cross bar 8—9 and slidingly carried in the lugs 19—20 preferably cast as extensions from the casing.

In order to feed the noodle roll to the device I preferably provide a chute 24 which is adjustably supported by a link 25 so that the chute may be tilted to various angles by simply lifting up the notched link 25 and adjusting the chute to the desired angle. This chute extends through an opening 33 in the rear of the casing A, the said opening being large enough to permit of sufficient adjustment of the chute and the supporting of the noodle roll 34 (indicated by dotted lines) thereon.

In order to readily cut the strips to desired widths I provide an adjustable spring metal stop 26 preferably carried with the knife so as to more readily free the severed portion as the knife is reciprocated. This stop 26 is rigidly attached to the cross piece 9 and has a knurled thumb screw 28 passing therethrough and threaded into the knife blade 7. The screw head extends through a slot 29 in the casing so as to be readily adjustable. Thus, as the screw 28 is rotated to the right or left, the stop 26 is adjusted toward and away from the shearing edge of the blades.

In order to suitably support the cutter I preferably provide a clamping bracket 30 adapted to be secured to a table or shelf so as to raise the cutting mechanism sufficiently above the table to place a suitable pan as 31, thereunder. The bottom of the enclosing casing is left open for the ejection of the severed portions of the strip and I provide a deflector 32 preferably in the form of an extension of the casing so as to cause the cut-off noodle portions to fall into the dish 31.

Thus, in the operation of the device it is first secured to a table or shelf with the stop 26 adjusted to cut a strip of the desired width. A pan 31 is then placed beneath the opening 34 at the bottom of the casing and the chute 24 adjusted. The noodle roll 34 is now placed upon the chute 24 and allowed to slide down into engagement with the stop 26 after which the handle 14 is operated to reciprocate the knife 7 thereby shearing off the noodle strips as the roll automatically descends or is fed by hand.

What I claim as new and desire to secure by United States Letters Patent is:

1. In a noodle-cutter of the character described, a casing, a handle operated gear driven crank rotatably mounted within the casing, a knife reciprocatably mounted within the casing and operatively connected with said crank, a feed-chute for feeding the noodle roll
said knife
the adj with